(12) United States Patent
Singh et al.

(10) Patent No.: US 7,139,320 B1
(45) Date of Patent: Nov. 21, 2006

(54) METHOD AND APPARATUS FOR MULTICARRIER CHANNEL ESTIMATION AND SYNCHRONIZATION USING PILOT SEQUENCES

(75) Inventors: Manoneet Singh, Campbell, CA (US); Arvind Lonkar, Santa Clara, CA (US); Jerry Krinock, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 706 days.

(21) Appl. No.: 09/975,667

(22) Filed: Oct. 11, 2001

(51) Int. Cl.
*H04K 1/10* (2006.01)
(52) U.S. Cl. ....................... 375/260; 375/362
(58) Field of Classification Search ................ 375/260, 375/316, 343, 344, 355, 362; 455/59, 60; 370/203
See application file for complete search history.

(56) References Cited

U.S. PATENT DOCUMENTS

| | | | |
|---|---|---|---|
| 5,228,062 A | 7/1993 | Bingham | 375/97 |
| 5,602,835 A | 2/1997 | Seki et al. | 370/206 |
| 5,625,573 A * | 4/1997 | Kim | 375/344 |
| 6,359,938 B1 * | 3/2002 | Keevill et al. | 375/316 |
| 6,483,553 B1 * | 11/2002 | Jung | 348/731 |
| 6,654,429 B1 * | 11/2003 | Li | 375/316 |
| 6,731,911 B1 * | 5/2004 | Hirata et al. | 455/71 |

FOREIGN PATENT DOCUMENTS

JP 2002-111624 A * 4/2002

OTHER PUBLICATIONS

Digital Video Broadcasting (DVB), "Framing structure, channel coding and modulation for digital terrestrial television", European Standard Telecommunications series, ETSI EN 300 744 V1.4.1, (Jan. 2001), pp. 24-28, published at Sophia Antipolis Cedex, France, by European Broadcasting Union.
IEEE 802.16ab-01/01r1, "Air Interface for Fixed Broadband Wireless Access Systems Part A: Systems between 2 and 11 GHz", Jul. 2001, pp. 164-168, published at New York, New York, by Institute of Electrical and Electronic Engineers, Inc.
P. H. Moose, "A Technique for Orthogonal Frequency Division Multiplexing Frequency Offset Correction", IEEE Transactions on Communications, vol. 42, No. 10, pp. 2908-2914, Oct. 1994.

(Continued)

*Primary Examiner*—Kevin Kim
(74) *Attorney, Agent, or Firm*—Steven A. Shaw; W. James Brady; Frederick J. Telecky, Jr.

(57) ABSTRACT

Method and apparatus for OFDM synchronization and channel estimation. In a temporal embodiment, received embedded system pilot symbols are inverse Fourier transformed at expected index locations and correlated with computed complex conjugates of inverse Fourier transforms of pilot symbols for providing a correlation function for the channel impulse response. In a frequency domain embodiment, embedded system pilot symbols are augmented with pilot-spaced inferred guard band symbols, multiplied by scaled complex conjugates of computed pilot systems, and inverse Fourier transformed into the channel impulse response. Time and frequency are synchronized in feedback loops from information in the channel impulse response. The channel impulse response is filtered, interpolated, and then Fourier transformed for determining channel estimates for equalization.

22 Claims, 13 Drawing Sheets

OTHER PUBLICATIONS

T. M. Schmidl and D. C. Cox, "Robust Frequency and Timing Synchronization for OFDM", IEEE Transactions on Communications, vol. 45, No. 12, pp. 1613-1621, Dec. 1997.

Jan-Jaap van de Beek, Magnus Sandell and Per Ola Borjesson, "ML Estimation of Timing and Frequency Offset in OFDM Systems", IEEE Transactions on Signal Processing, vol. 45, No. 7, pp. 1800-1805, Jul. 1997.

T. Keller and L. Hanzo, "Orthogonal Frequency Division Multiplex Synchronisation Techniques for Wireless Local Area Networks", Proceedings for PIMRC, Taiwan, pp. 963-967, Oct. 1996.

M. Julia Fernandez-Getino Garcia, Santiago Zazo and Jose M. Paez-Borrallo, "Tracking of Time-Frequency Misalignments in 2D Pilot-Symbol-Aided Coherent OFDM Systems", Proceedings of IEEE Vehicular Technology Conference VTC-2000, pp. 1704-1709 year 2000.

Stefan A. Fechtel, "OFDM Carrier and Sampling Frequency Synchronization and its Performance on Stationary and Mobile Channels", IEEE Transactions on Consumer Electronics, vol. 46, No. 3, pp. 438-441, Aug. 2000.

Takashi Wakutsu and Mutsumu Serizawa, "A Carrier Frequency Offset and Timing Offset Detection Scheme for OFDM Systems Utilizing Pilot Sub-Carriers", IEICE Transactions on Communications, vol. E83-B, No. 8, pp. 1854-1863, Aug. 2000.

James K. Cavers, "An Analysis of Pilot Symbol Assisted Modulation for Rayleigh Fading Channels," IEEE Transactions on Vehicle Technology, vol. 40, No. 4, pp. 686-693, Nov. 1991.

* cited by examiner

METHOD AND APPARATUS FOR MULTICARRIER CHANNEL ESTIMATION AND SYNCHRONIZATION USING PILOT SEQUENCES

BACKGROUND OF THE INVENTION

1. Field of the Invention

The invention relates to orthogonal frequency division multiplex (OFDM) communication systems and more particularly to synchronization and channel estimation for an OFDM communication system.

2. Description of the Prior Art

Several synchronization and channel parameters must be estimated before symbol decisions can be made in systems using coherent multicarrier communication such as orthogonal frequency division multiplex (OFDM) systems. A receiver must identify the start of a packet or frame (time synchronization), adjust for offsets in sampling phase and carrier frequency (frequency synchronization), and equalize for the channel impulse response (channel equalization). Inaccurate synchronization leads to inter-symbol interference (ISI) or inter-carrier interference (ICI), both of which degrade the overall bit error rate (BER) performance of the system. Errors in channel estimation also lead to BER degradation.

Most recent multicarrier system standards require guard band symbols of zero level and also symbols known as pilots. The guard band symbols are used to help contain the spectrum of the signal within the spectrum that is allowed for the system. The system pilot symbols are interspersed with user data symbols. FIG. 1A is a chart showing amplitudes for guard band zeros, user data symbols and system pilot symbols on a vertical axis versus a symbol index from $-N/2$ to $+N/2$ on a horizontal axis where N is the total number of symbols in a symbol block. The amplitudes of the user data symbols go up and down as they are modulated with information from a user. The system pilot symbols have known modulations that may or may have constant amplitude.

Conventional OFDM systems use frequency domain pilot-assisted channel estimation in order to measure the channel attenuations on those carriers for channel equalization. Unfortunately, the conventional frequency domain pilot-assisted channel estimation methods require an additional frequency domain filter for interpolating the channel response between the carriers of the pilots and the BER performance of such systems is sub-optimal depending on the choice of this interpolation filter.

Several existing OFDM systems use special time domain structures for time synchronization. For example, IEEE 802.11 describes time synchronization using a preamble and digital audio broadcasting in Europe uses null symbols. However, such special synchronization structures reduce channel efficiency and in any case are not available in some OFDM standards.

Recent multicarrier standards such as Digital Video Broadcasting (DVB) and OFDM access (OFDMA) mode in IEEE 802.16 have eliminated special time domain structures and rely instead on a part of the OFDM packet called a cyclic prefix (CP) for synchronization. This method has the advantage of greater efficiency because the cyclic prefix always exists in OFDM signal packets as a guard to eliminate ISI between successive packets.

FIG. 1B is a block diagram showing the cyclic prefix (CP) method of the prior art for synchronization. In the CP method, an OFDM block includes OFDM samples for the cyclic prefix that are prepended to the beginning of the OFDM block. The prepended cyclic prefix OFDM samples are duplicates of a predetermined number of OFDM samples from the end of the OFDM block. The OFDM samples separated by the total number of samples in the OFDM block minus the number of cycle prefix samples are complex multiplied. The resulting products are passed to a shift register. Then, the registers are summed to provide a correlation function. Peaks in the correlation function provide information for time and frequency synchronization.

Unfortunately, a receiver using the cyclic prefix method for time synchronization of a signal received through a dispersive channel is prone to intersymbol interference (ISI) that causes degraded sensitivity and an irreducible error floor. In order to avoid both the inefficiency of the special time domain structures and the ISI that results from the CP method, workers have proposed frequency domain pilot-assisted time synchronization methods using phase rotation observed on the OFDM pilots.

The frequency domain pilot-assisted time synchronization methods have the advantage that the pilots are required by the existing OFDM standards for channel equalization. However, existing frequency domain methods require additional receiver hardware for computing the phase rotations on the pilot tones, and the measurements are artificially decoupled from the effect of the channel itself on the various tones. Thus, these methods lock to the center of gravity of the channel impulse response as opposed to its dominant path, leading to ambiguity in where to start the demodulation window, and causing an associated loss in received signal energy. The resulting synchronization performance is often sub-optimal in a dispersive channel.

Frequency synchronization using the cyclic prefix is also known for existing OFDM systems. Unfortunately, the range of frequency offset that is determined with the cyclic prefix is limited to $\pm\frac{1}{2}$ the subcarrier spacing. Moreover, the frequency synchronization cyclic prefix method also suffers from ISI. In order to avoid these limitations workers have proposed frequency domain pilot-assisted frequency synchronization methods using the pilots in the OFDM standards. However, because the effect of a carrier offset is energy leakage between adjacent carriers (ICI), a frequency offset is very difficult to estimate in frequency domain. Methods exist to reduce the ICI by detecting the collapse of the orthogonality condition using different windowing and filtering techniques. However, these methods have not been robust up to the present time.

There continues to be a need for improvements in the signal processing apparatus and methods for achieving time and frequency synchronization and channel equalization in multicarrier communication systems.

SUMMARY OF THE INVENTION

It is therefore an object of the present invention to provide an apparatus and a method using temporal pilot-assisted time synchronization, frequency synchronization, and/or channel estimation.

In a second embodiment, it is an object of the present invention to provide an apparatus and a method having an improved frequency domain pilot-assisted time synchronization, frequency synchronization, and/or channel estimation.

Briefly, the invention is summarized as follows. We denote a total number of carriers used in an Orthogonal Frequency Division Multiplex (OFDM) transmission as N, of which $N_P$ are modulated using (known) pilot symbols. Due to linearity of a Discrete Inverse Fast Fourier Transform (IFFT) modulator, a time-domain waveform for the transmitted OFDM signal x(n) can be logically separated into two components s(n) and p(n) as shown in equation 1, where n is the sample time index for an OFDM block.

$$x(n)=s(n)+p(n) \quad (1)$$

The s(n) is the part of the OFDM signal composed of the $N-N_P$ useful (non-pilot) information carriers or tones, denoted as $X_k$ in equation 2, each modulated by a complex number representing the information where k is the symbol index of the tone to the IFFT modulator and $(1, \ldots N)\backslash \upsilon$ is the set of indices of all tones excluding the pilot tones in any one OFDM block. It should be noted that N is the total number of symbol indexes k in a symbol block and also the number of OFDM sample indexes n in an OFDM sample block. It should also be noted that some of the symbol indexes k are positions of guard band symbols of zero value.

$$s(n) = \frac{1}{\sqrt{N}} \sum_{k \in \{1, \ldots N\}\backslash \upsilon} X_k e^{j\frac{2\pi kn}{N}} \quad (2)$$

The p(n) is the part of the OFDM signal generated from the $N_P$ pilot tones each modulated by a known complex number, denoted as $P_k$ in equation 3, where $\upsilon$ represents the set of indices of the pilot tones in any one OFDM block.

$$p(n) = \frac{1}{\sqrt{N}} \sum_{k \in \upsilon} P_k e^{j\frac{2\pi kn}{N}} \quad (3)$$

The signal y(n) received after the transmission of OFDM Signal x(n) over a dispersive channel h(n) with additive noise w(n) may be modeled as shown in equation 4, where $\Theta$ denotes circular convolution if the memory of the channel is less than the length of the Cyclic Prefix.

$$y(n)=x(n)\Theta h(n)+w(n) \quad (4)$$

At the receiver, the source symbols are first extracted from the sequence y(n) using a fast Fourier Transform (FFT) demodulator as shown in equation 5 for providing information tones or symbols $Y_k$.

$$Y_k = \frac{1}{\sqrt{N}} \sum_{n=1}^{N} y(n) e^{-j\frac{2\pi kn}{N}} \quad (5)$$

For time synchronization, the received pilot symbols alone are tapped off and fed to a pilot IFFT modulator that converts the symbols back to a received time domain pilot OFDM block signal rp(n) as shown in equation 6.

$$rp(n) = \frac{1}{\sqrt{N}} \sum_{k \in \upsilon} Y_k e^{j\frac{2\pi kn}{N}} \quad (6)$$

The complex conjugate of the known system pilot part of the OFDM signal generated from the $N_P$ pilot information tones is precomputed in the receiver as pp*(n), where pp(n) matches the p(n) of the equation 3 and "*" represents complex conjugation. Then, an accumulated correlation function $\rho_{Pilot}(m)$ is determined according to equation 7 between the precomputed pilot block pp*(n) and received pilot block rp(n) of the equation 6 where m is the correlation sample time index of the pilot correlation block. It should be noted that the correlation function is the channel impulse response (CIR).

$$\rho_{Pilot}(m) = \sum_{n=1}^{N_P} pp^*(n) rp(n+m) \quad (7)$$

The observed peaks of the correlation function $\rho_{Pilot}(m)$ denote that the received pilot block rp(n) is "matched" to the precomputed pilot block pp(n). The time sampling instants associated with these peaks trace the path delay profile of the channel and identify correct time synchronization (window alignment) for the start of a new OFDM block signal x(n). Thus, time synchronization is achieved.

For frequency synchronization, two variations are proposed. A first variation uses open loop synchronization. The phase difference of the correlation function is determined at the peaks associated with adjacent blocks and then processed through a discriminator to obtain an estimate of the frequency offset between the local clocks at the receiver and the reference clocks at the transmitter. The estimate is then used to adjust the local clocks.

A second variation uses closed loop synchronization. The receiver sweeps its local clock until a peak that exceeds a threshold is seen in the correlator function. The frequency at which the peak is observed is then the required frequency matched to the transmitter.

Finally, channel estimation is achieved by taking the correlations between the received pilot block rp(n) and the precomputed block output pp(n), passing them through a discrete noise reduction filter of the present invention, zero padding the correlations (an $N_p$ point time sequence) with $N-N_p$ zeros, and then taking an N point FFT of the resultant zero padded sequence to produce interpolated values of the channel transfer function along all tones. The interpolated values of the channel transfer function are then used for equalization. A classical one-tap frequency domain equalizer may be used. Or, the values may be input as channel state information (CSI) to a soft decoder. Preferably, the same IFFT/FFT processor can be used and time shared for OFDM transmission, OFDM reception, receiver time and frequency synchronization, and channel estimation.

A second embodiment of the present invention is termed herein a frequency domain embodiment. Briefly, in the frequency domain embodiment, a guard pilot calculator uses outer system pilot symbols for estimating and inserting the symbols that would have been received if system pilot symbols had been extended into the system guard band. The received pilot symbols and the inferred pilot guard band symbols are multiplied by scaled complex conjugates of the corresponding precomputed system pilot symbols $P_k^*/|P_k|^2$ to form pilot response products. A data zero generator inserts zero symbols for the non-pilot symbols and an N wide receiver symbol IFFT inverse Fourier transforms the products for providing the channel impulse response (CIR) or correlation function $\rho_{Pilot}(m)$.

The detailed description to follow describes preferred embodiments of the present invention which are illustrated in the various figures. Other embodiments will undoubtedly become obvious by those skilled in the art after having read this description and viewing these drawing figures.

IN THE DRAWINGS

DETAILED DESCRIPTION OF THE PREFERRED EMBODIMENTS

Figure 1A:
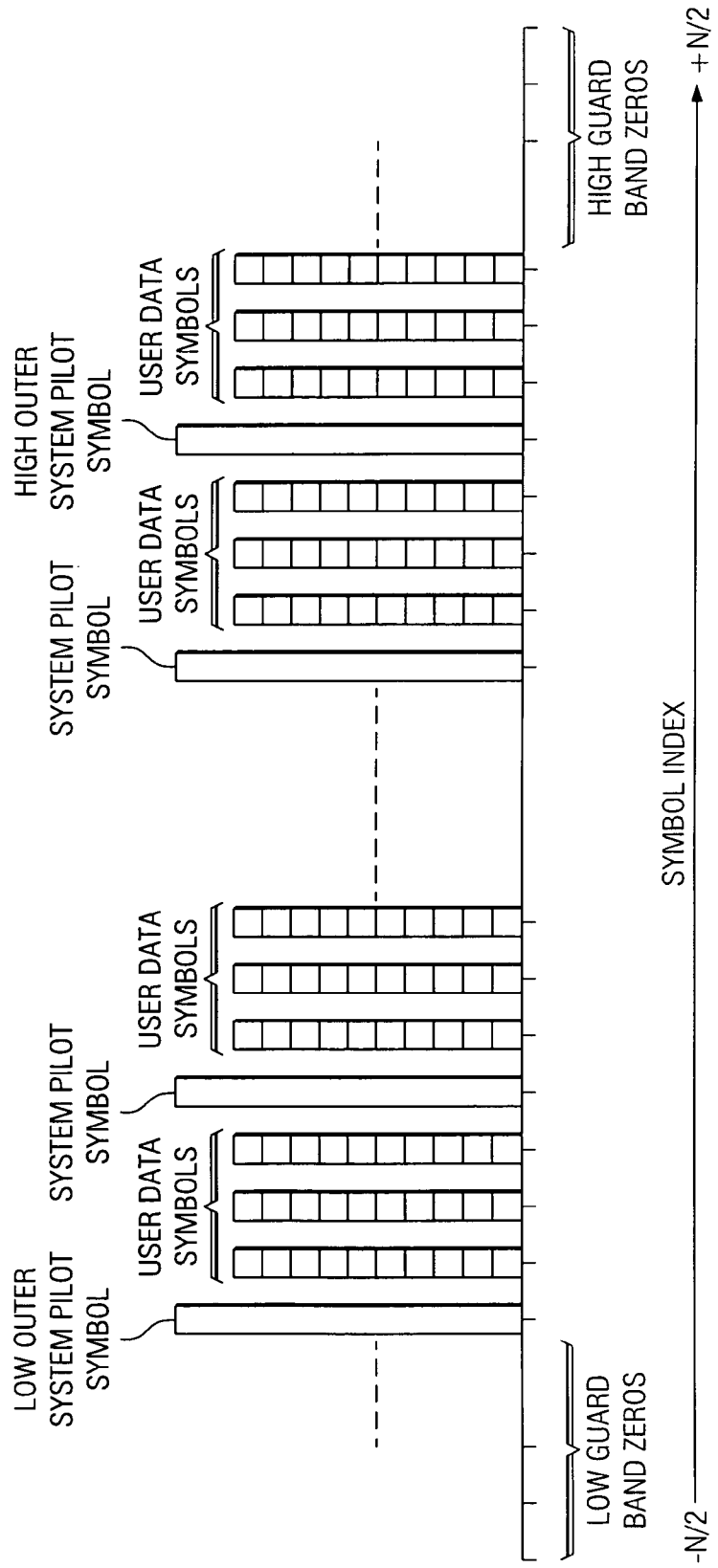
FIG. 1A is a chart showing guard band, pilot, and user data symbols versus symbol index.
Figure 1B:
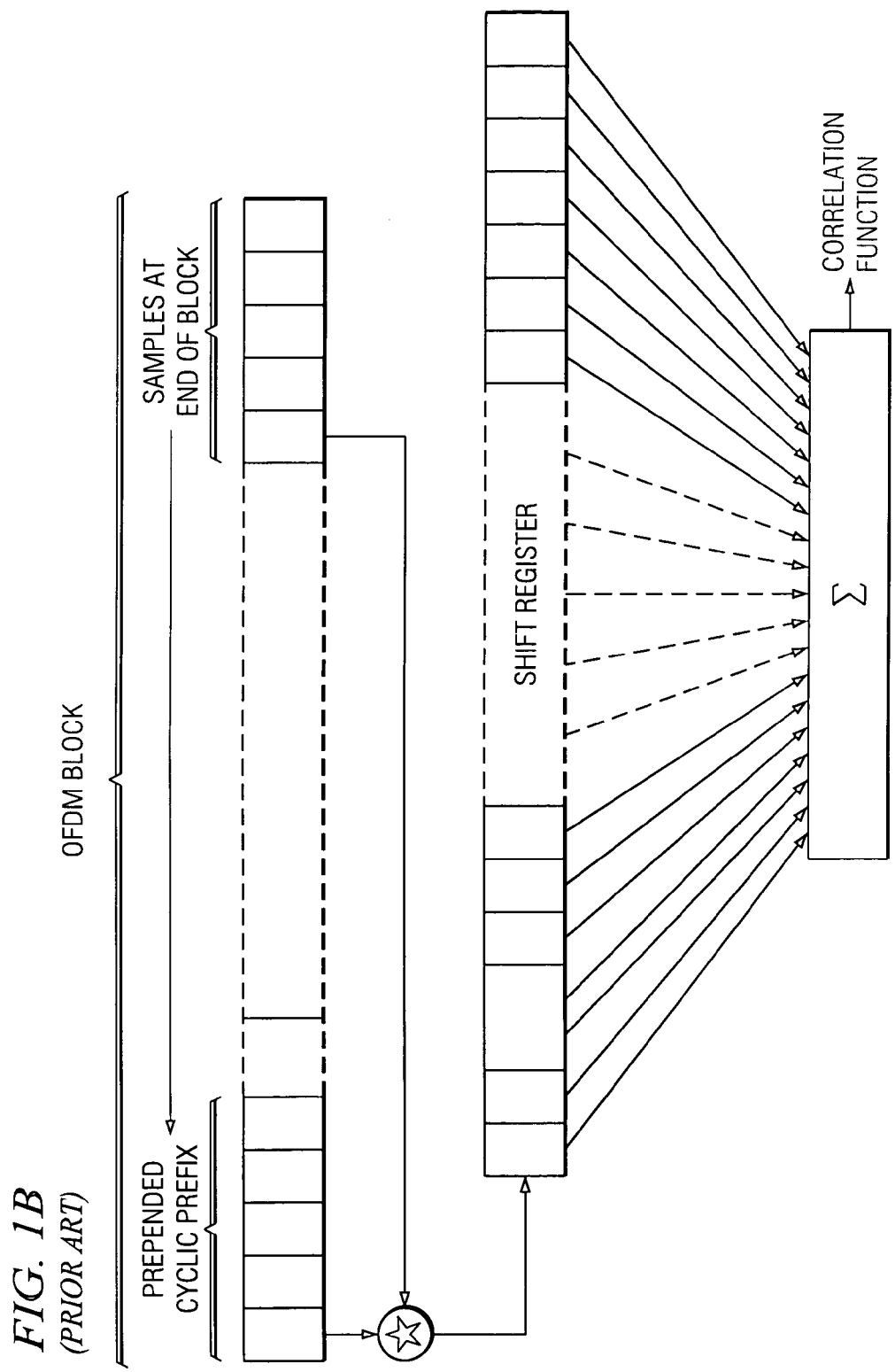
FIG. 1B is a block diagram of a cyclic prefix correlator used for synchronization in the prior art.

FIG. 1A is a chart showing guard band zeros, system pilot symbols, and user data symbols versus symbol index as described in the background section above. FIG. 1B illustrates a cyclic prefix correlator of the prior art for synchronization as described in the background section above.

Figure 2:
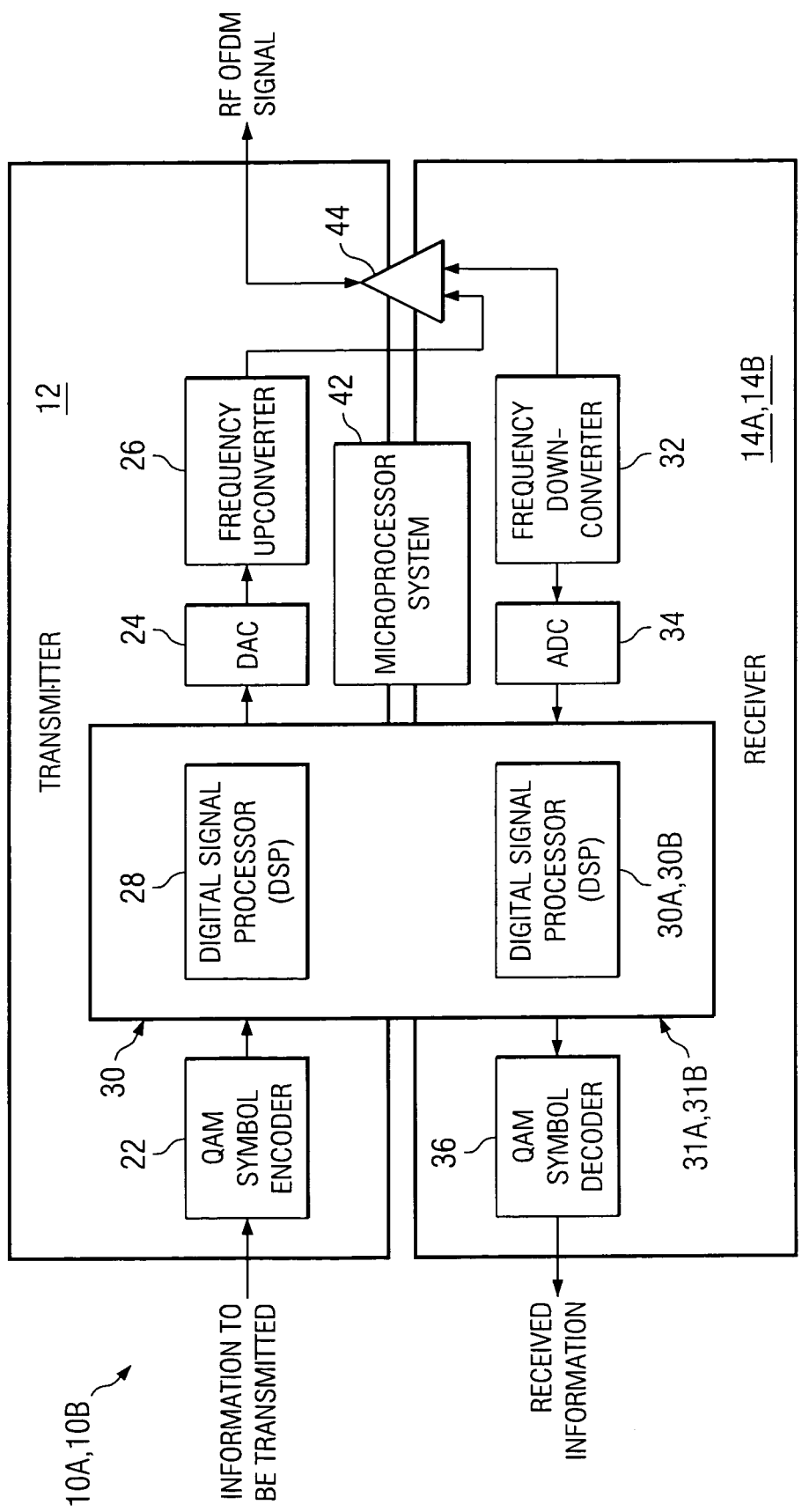
FIG. 2 is a block diagram of an OFDM transceiver of the present invention.

FIG. 2 is a block diagram of an orthogonal frequency division multiplex (OFDM) transceiver of the present invention having embodiments referred to with reference numbers 10A and 10B. The embodiment of the OFDM transceiver referred to as 10A includes a transmitter 12 for transmitting a radio frequency (RF) OFDM signal and a receiver 14A for receiving an RF OFDM signal. The embodiment of the OFDM transceiver referred to as 10B includes the transmitter 12 for transmitting a radio frequency (RF) OFDM signal and a receiver 14B for receiving an RF OFDM signal.

The transmitter 12 includes a quadrature amplitude modulation (QAM) symbol encoder 22, a digital-to-analog converter (DAC) 24, a frequency upconverter 26, and a digital signal processor (DSP) 28. It should be noted that complex signal processing is used for all signals. That is, each signal is processed for an in-phase (I) and a quadrature phase (Q) value (or an amplitude value and a phase value).

The QAM symbol encoder 22 converts an input signal having user information that is to be transmitted into user data QAM symbols; and also inserts system pilot QAM symbols and adds guard band QAM symbols. The system pilot QAM symbols are given QAM values and then interspersed with the user QAM signals in a specified manner according to the OFDM system specification that is used by the transceiver 10A–B. The system specification in a preferred embodiment also designates a certain number of QAM symbols at the beginning of a symbol block and a certain number of QAM symbols at the end of the symbol block as guard band symbols. The guard band QAM symbols are typically set to zero. The QAM symbols including the user data QAM symbols, the interspersed system pilot QAM symbols, and the added guard band QAM symbols are then passed to the DSP 28.

The DSP 28 converts the QAM symbols into serial OFDM samples and passes the samples to the DAC 24. The DAC 24 converts the serial OFDM samples from digital form to analog form. The frequency upconverter 26 upconverts the analog OFDM samples to a transmitter radio frequency (RF) OFDM signal having the OFDM samples as a serial signal sequence.

The receiver 14A includes a digital signal processors (DSP) 30A and the receiver 14B includes a DSP 30B. The receivers 14A and 14B also include a frequency downconverter 32, an analog-to-digital converter (ADC) 34, and a QAM symbol decoder 36. The frequency downconverter 32 downconverts a receiver RF OFDM signal having a serial signal sequence of OFDM samples to a lower frequency. The ADC 34 converts the OFDM samples in the received lower frequency OFDM signal from an analog form to a digital form. The DSP 30A or the DSP 30B converts the digital OFDM samples into receiver QAM symbols having received interspersed user data QAM symbols and system pilot QAM symbols, and the guard band QAM symbols. When the OFDM receiver 14A–B and an OFDM transmitter transmitting the received RF OFDM signal are frequency and time synchronized, the received pilot and data QAM symbols are representative of the input pilot and data QAM symbols that were inverse Fourier transformed and then transmitted by the transmitter of the RF OFDM signal. The QAM symbol decoder 36 converts received QAM symbols into an output signal having user received information.

The DSP 28 and the DSP 30A are parts of a DSP system 31A that is shared by the transmitter 12 and the receiver 14A. Similarly, the DSP 28 and the DSP 30B are parts of a DSP system 31B that is shared by the transmitter 12 and the receiver 14B. In a first preferred embodiment the same hardware for DSP system 31A (or 31B) is time shared between the DSP 28 and the DSP 30A (or 30B). In another preferred embodiment the hardware of the DSP system 31A (or 31B) is segmented between the DSP 28 and the DSP 30A (or 30B).

The transceiver 10A–B also includes a microprocessor system 42 and an antenna section 44 shared between the transmitter 12 and the receiver 14A–B. The microprocessor system 42 includes memory, a microprocessor, and associated hardware. The memory stores program codes and data. The microprocessor and associated hardware read from and write into the memory for automating the operation of the transceiver 10A–B. Of course, design tradeoffs can be made for allocating the functions of the transceiver 10A–B in various ways between the DSP system 31A–B and the microprocessor system 42. The antenna section 44 converts the transmitter RF OFDM signal from a conducted form to an airwave form and converts the received RF OFDM signal from an airwave form to a conducted form.

Figure 3:
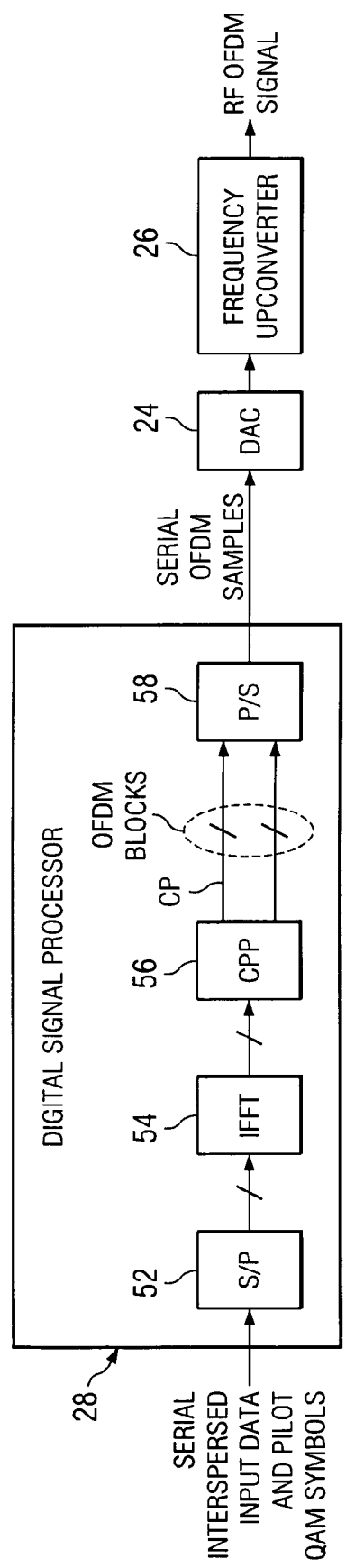
FIG. 3 is a block diagram of an OFDM transmitter of the OFDM transceiver of FIG. 2.

FIG. 3 is a block diagram of the transmitter 12 showing the DAC 24, the frequency upconverter 26, and the DSP 28 as described above. The DSP 28 include a serial-to-parallel (S/P) converter 52, an inverse fast Fourier transform (IFFT) converter 54, a cyclic prefix (CP) prepender 56 (abbreviated as CPP), and a parallel-to-serial (P/S) converter 58. More generally, the IFFT converter 54 may be an inverse discrete Fourier transform (IDFT) converter. The serial-to-parallel 52 converts symbol blocks of interspersed data and pilot QAM symbols and the guard band QAM symbols from the QAM symbol encoder 22 from serial to parallel.

A system specification designates that certain ones of the QAM symbols at designated locations are system pilots with designated QAM values. In an exemplary embodiment, blocks of 2048 QAM symbols (N=2048) are converted from serial to parallel; and of the 2048 QAM symbols, 512 ($N_P$=512) are designated as system pilot QAM symbols and 1536 ($N-N_P$=1536) are designed as user data QAM symbols or guard symbols. Modulation on the user data QAM symbols carries information that is useful to the user. System pilot QAM symbols carry information required by the specification of the system. The IFFT 54 inverse Fourier transforms the parallel QAM symbols into OFDM blocks of OFDM samples. The inverse Fourier transform is symmetrical so that there are the same total number N of OFDM samples in parallel in an OFDM block as there are QAM symbols in a QAM symbol block.

The IFFT 54 operates by modulating the input QAM symbols onto tones and then summing the amplitudes of all the tones uniquely for each of the output OFDM samples so that each of the output OFDM samples has multiple tones and carries information from all the input QAM symbols. Although all electric signals can always be expressed in the time domain or in the frequency domain, it is a convention in the OFDM art to consider the QAM symbols to be frequency domain signals and to consider the OFDM samples to be time domain (temporal) signals.

The CPP 56 prepends the beginning of the original OFDM block with duplicates of a predetermined number of original OFDM samples from the end of the original OFDM block to form a new, larger OFDM block. The parallel-to serial converter 58 converts the new, larger OFDM block of samples including the original OFDM samples and the CP OFDM samples into serial OFDM samples and passes the serial OFDM samples to the DAC 24.

Figure 4:
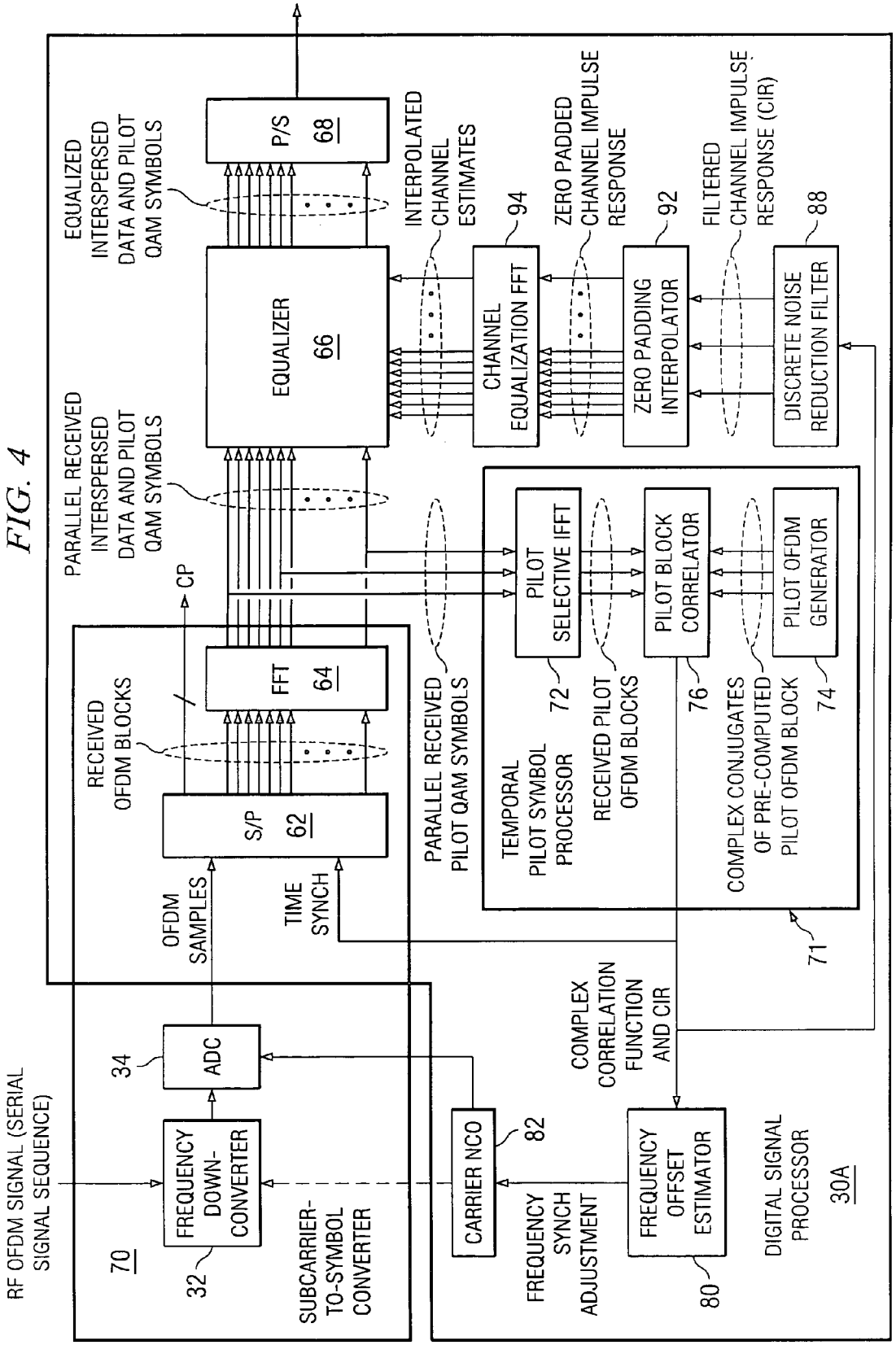
FIG. 4 is a block diagram of an OFDM receiver of the present invention for the OFDM transceiver of FIG. 2 using temporal correlation.

FIG. 4 is a block diagram showing the DSP 30A, the frequency downconverter 32, and the ADC 34 of the receiver 14A as described above. The DSP 30A includes a time synchronization serial-to-parallel (S/P) converter 62, a fast Fourier transform (FFT) converter 64, an equalizer 66, and a parallel-to-serial (P/S) converter 68. The S/P 62 converts the received serial OFDM samples from the ADC 34 to received parallel OFDM samples (OFDM blocks of OFDM samples). The prepended CP OFDM samples are split off from the original OFDM samples and processed separately. The FFT 64 Fourier transforms the non-CP received OFDM blocks for providing received parallel interspersed data and pilot QAM symbols and the guard band QAM symbols. More generally, the FFT converter 64 may be a discrete Fourier transform (DFT) converter.

The equalizer 66 equalizes the QAM symbols according to an estimate of the channel frequency response in order to compensate for the uneven effects of the channel at the multiple channel carrier frequencies used by the RF OFDM signal. The parallel-to-serial (P/S) converter 68 is optional for converting the equalized parallel QAM symbols to serial. Either parallel or serial equalized QAM symbols are then passed to the QAM symbol decoder 36.

It should be noted that the serial signal sequence of modulated subcarriers of the received RF OFDM signal continues to be present in a representative form in the lower frequency signal output of the frequency downconverter 32 and the digital signal output of the ADC 34. A subcarrier-to-symbol converter 70 includes the S/P converter 62 and the FFT 64 for converting a serial signal sequence of modulated subcarriers to the parallel data, pilot, and guard band symbols. In preferred embodiments, the subcarrier-to-symbol converter 70 also includes the ADC 34, or includes the frequency downconverter 32 and the ADC 34.

The DSP 30A also includes a temporal pilot symbol processor 71 including a pilot selective inverse fast Fourier transform (IFFT) converter 72, a pilot OFDM generator 74, and a pilot block correlator 76. The pilot selective IFFT 72 selects the received system pilot QAM symbols from the output of the FFT 64 and then performs an inverse Fourier transform of the selected QAM symbols for providing a received pilot OFDM block of pilot OFDM samples $rp_1$, $rp_2$, $rp_3$, $rp_3$ through $rp_{Np}$. In general, the pilot selective IFFT converter 72 may be an IDFT converter. The pilot OFDM generator 74 generates a precomputed OFDM block of complex conjugates of precomputed pilot samples $pp_1^*$, $pp_2^*$, $pp_3^*$, $pp_4^*$ through $pp_{Np}^*$ based upon knowledge of the system specification for the OFDM signal. The pilot block correlator 76 correlates the received pilot OFDM block with the precomputed pilot OFDM block for providing a complex correlation function $\rho_{Pilot}$. It should be noted that the correlation function is also the channel impulse response (CIR) for the channel between the transmitter of the RF OFDM signal and the receiver 14A–B.

Figure 6:
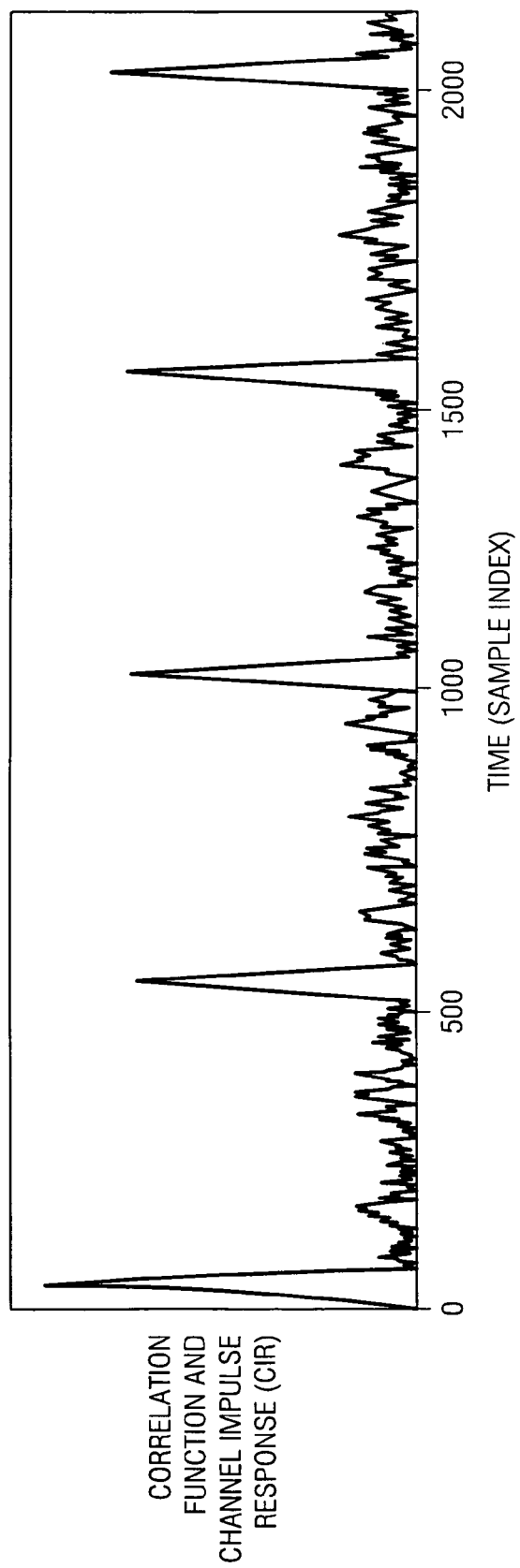
FIG. 6 is a time chart of a correlation function issued by the IFFT pilot block correlator of FIG. 5 and by the pilot frequency domain symbol processor of FIG. 11.

Also included in the DSP 30A are a frequency offset estimator 80, a frequency adjustable signal source implemented as a numerically controlled oscillator (NCO) 82, and a discrete noise reduction filter 88. The correlation function or CIR is passed to the time synchronization S/P converter 62, the frequency estimator 80, and the discrete noise reduction filter 88. A time chart of the amplitude of such correlation function is illustrated in FIG. 6 and described in the accompanying description below.

The amplitude of the correlation function or CIR is greatest when the received pilot OFDM block is aligned (time synchronized) with the precomputed pilot OFDM block and the receiver-generated frequencies used by the frequency downconverter 32 and the ADC 34 for receiving the receiver RF OFDM signal are frequency synchronized with the frequency used by the OFDM transmitter that originally generated the received RF OFDM signal. Both the time synchronization and the frequency synchronization must both occur in order for the receiver 14A–B to properly process the QAM symbols from the received RF OFDM signal.

The time synchronization S/P converter 62 uses the correlation function for time synchronizing by aligning the start times (window) it uses for serial to parallel conversion in order to maximize the amplitude of the correlation function (CIR) in a feedback loop.

The frequency offset estimator 80 uses information for the maximum amplitude of the correlation function for providing a frequency synchronization adjustment to the NCO 82. The NCO 82 adjusts its frequency according to the frequency synchronization adjustment and issues a reference signal having a frequency that is adjusted according the frequency synchronization adjustment. In a preferred embodiment, the ADC 34 uses the adjusted frequency for digitizing the analog OFDM samples to the ADC 34. In another preferred embodiment, the frequency downconverter 32 uses the adjusted frequency for generating one or more of its local frequencies used for downconverting the RF OFDM signal. In another preferred embodiment, the NCO 82 may include multiple numerically controlled oscillators for providing multiple adjusted frequencies used in one or both of the ADC 34 and the frequency downconverter 32. In any case the frequency or frequencies from the NCO 82 is or are adjusted so that the correlation function is maximized.

The DSP 30A further includes a zero padding interpolator 92 and a channel equalization fast Fourier transformer (FFT) 94. The noise reduction filter 88 receives the correlation function or channel impulse response (CIR) as a raw CIR from the pilot block correlator 76 (or frequency domain pilot symbol processor 300 described below and illustrated in FIGS. 10 and 11) and issues a filtered CIR to the interpolator 92. In a preferred embodiment, the filter 88 filters the channel impulse response by setting the filtered CIR to zero for the sample time indexes where the raw CIR is less than a threshold and setting the filtered CIR to the value of the raw CIR for the sample time indexes where the raw CIR is equal to or greater than the threshold. The interpolator 92 zero pads the impulse response from Np to N and passes a padded channel impulse response to the channel equalization FFT 94. The FFT 94 Fourier transforms the padded impulse response for providing interpolated channel estimates to the equalizer 66. In general, the FFT converter 94 may be a DFT converter. The equalizer 66 uses the channel estimates for equalizing the QAM symbols, respectively, from the FFT 64.

Figure 5:
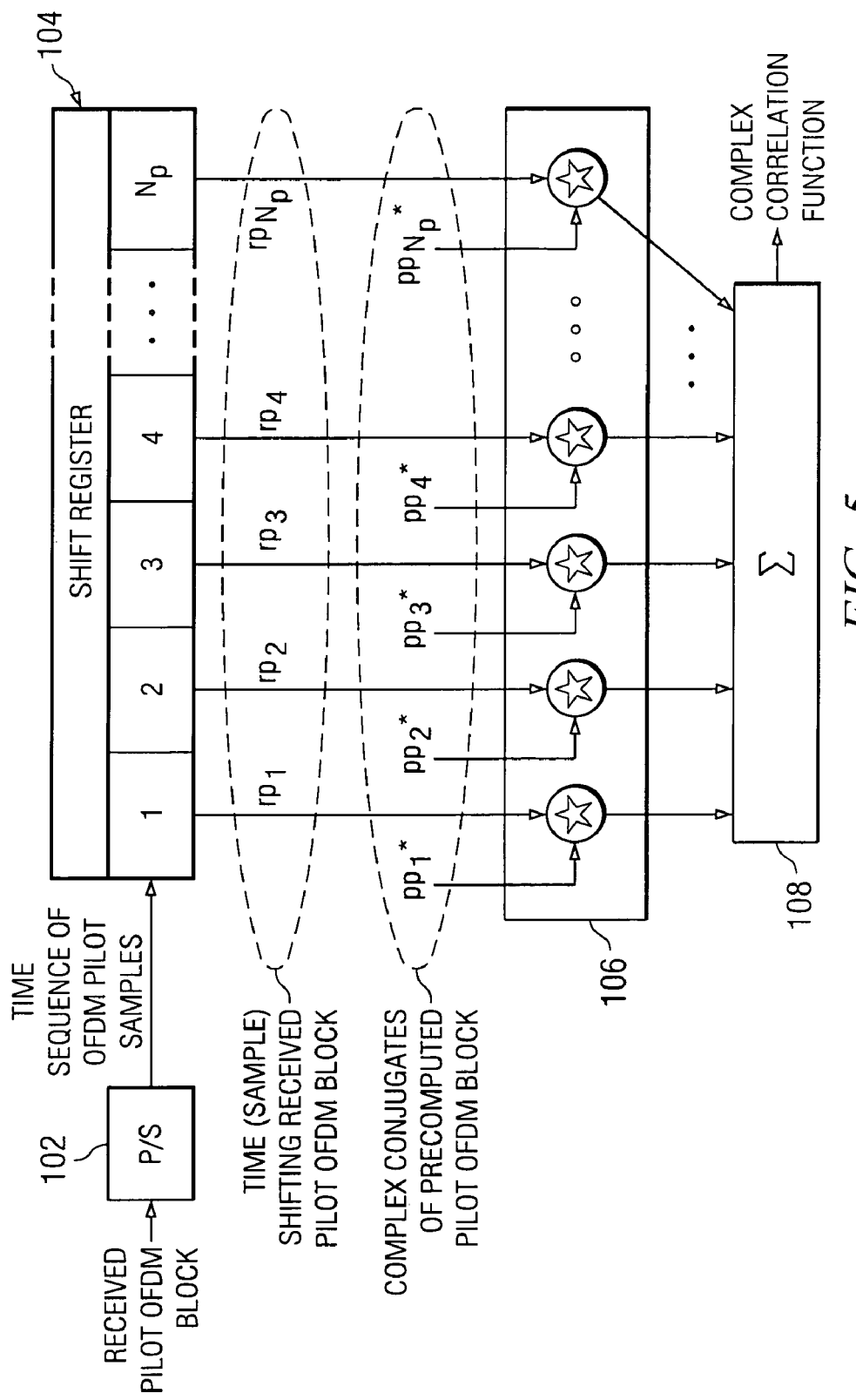
FIG. 5 is a block diagram of an IFFT pilot block correlator of the present invention for the OFDM receiver of FIG. 4.

FIG. 5 is a block diagram of the pilot block correlator 76 described above. The pilot block correlator 76 includes a parallel to serial (P/S) converter 102, an $N_P$ long shift register 104, an Np wide multilevel complex multiplier 106, and an $N_P$ wide complex summer 108, where $N_P$ is the number of pilot OFDM samples in the pilot OFDM block. The P/S converter 102 converts the received pilot OFDM block from the pilot selective IFFT 72 from parallel to serial. The shift register 104 continuously shifts the serial received pilot OFDM block and issues a time shifting version of the OFDM block having parallel outputs denoted $rp_1$, $rp_2$, $rp_3$, $rp_4$ through $rp_{Np}$ for time shifts of 1, 2, 3, 4 through $N_P$ OFDM sample times (indexes), respectively.

The multiplier 106 multiplies the received pilot (RP) OFDM samples $rp_0$, $rp_1$, $rp_2$, $rp_3$ through $rp_N$ by the complex conjugates of the precomputed pilot (PP) OFDM samples denoted $pp_1^*$, $pp_2^*$, $pp_3^*$, $pp_4^*$ through $pp_{Np}^*$ of the precomputed pilot OFDM block, respectively. The summer 108 sums the 1 though Np products for providing the complex correlation function.

FIG. 6 is a time chart of the amplitude of the complex correlation function showing continuing time or samples on the horizontal axis and amplitude on the vertical axis. The scale of the horizontal axis is 0 to 2000+ samples and the scale on the vertical axis is arbitrary. The correlation sample index m repeats over the range 1 to Np where Np is the number of system pilot QAM symbols. The peaks in amplitude reoccur at a period of Np correlation sample indexes. In an exemplary case, Np=512.

Figure 7A:
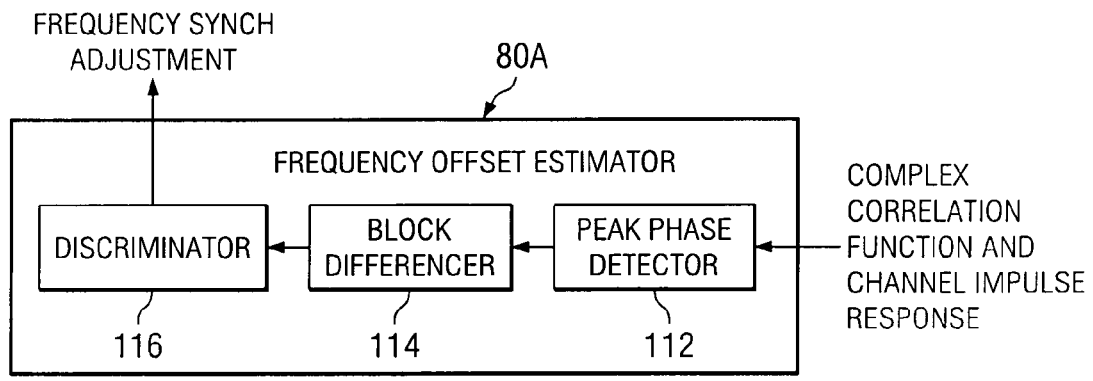
FIG. 7A is a first variation of a frequency offset estimator of the present invention for the OFDM receivers of FIGS. 4 and 10.
Figure 7B:
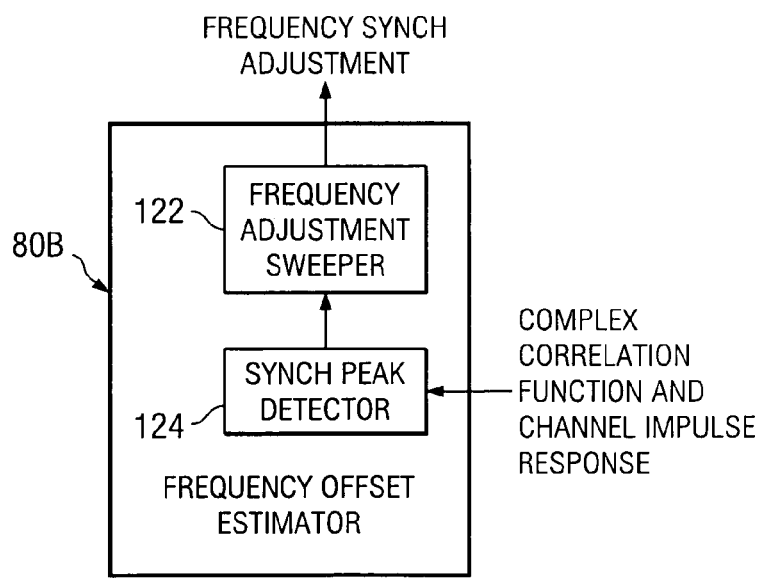
FIG. 7B is a second variation of a frequency offset estimator of the present invention for the OFDM receivers of FIGS. 4 and 10.

FIGS. 7A and 7B are block diagrams of variations 80A and 80B, respectively, of the frequency offset estimator 80.

The frequency offset estimator 80A includes a peak phase detector 112, a block differencer 114, and a discriminator 116. The peak phase detector 112 determines phase of the complex correlation function (channel impulse response) at each amplitude peak. The block differencer 114 uses the successive phases (corresponding to successive amplitude peaks) from the peak phase detector 112 for determining a phase difference. The discriminator 116 uses the phase differences for providing the frequency synchronization adjustment.

The frequency offset estimator 80B includes frequency adjustment sweeper 122 and a synch peak detector 124. The frequency offset sweeper 122 sweeps the frequency synchronization adjustment while the synch peak detector 124 monitors the correlation function. When a peak in the correlation function exceeds a threshold, the synch peak detector 124 causes the frequency offset sweeper 122 to hold the frequency synchronization adjustment to the adjustment that resulted in the peak.

Figure 8:
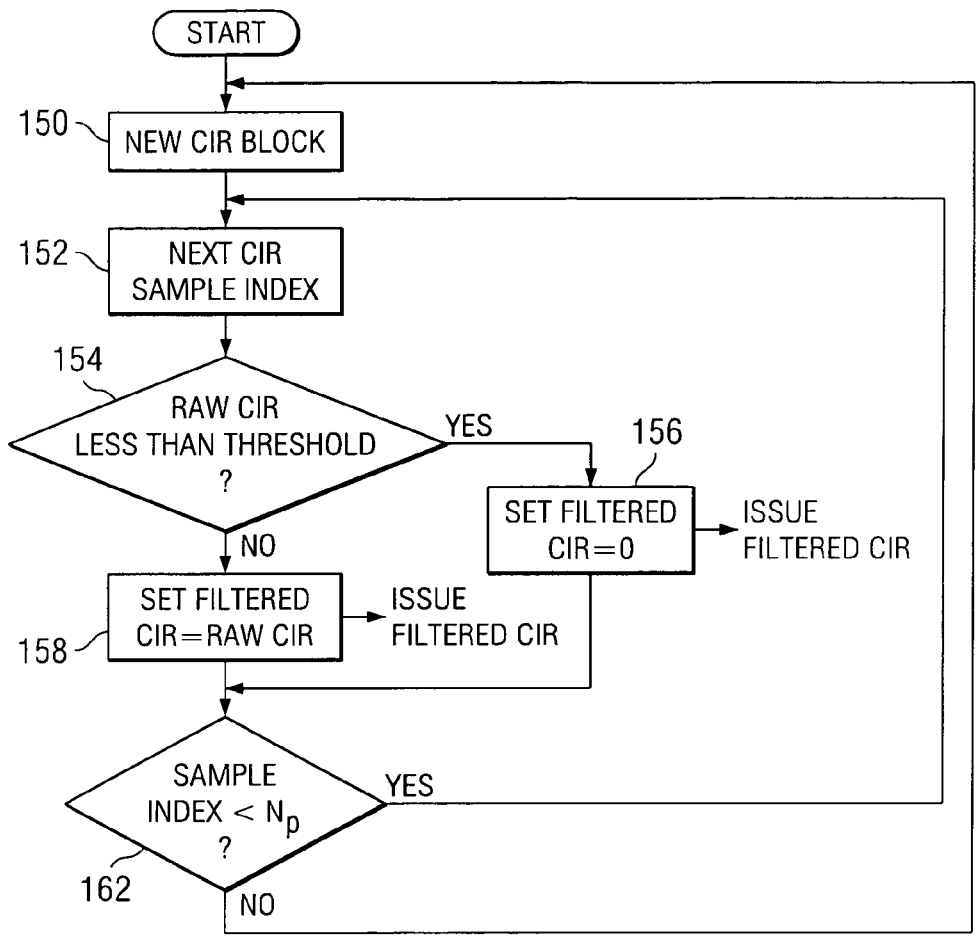
FIG. 8 is a flow chart of a discrete noise reduction filter of the present invention for the OFDM receivers of FIGS. 4 and 10.

FIG. 8 is a flow chart of the operation or the discrete noise reduction filter 88. It should be noted that the correlation function is a channel impulse response (CIR) that is a function of time or discrete correlation or CIR sample index as shown in FIG. 6. The correlation sample index m (shown on the horizontal axis in FIG. 6) repeats over a range of 1 to Np where Np is the number of system pilots. In a step 150 the CIR (correlation) sample index m is set to zero for a new CIR (correlation) block. In a step 152 the filter 88 receives the raw unfiltered CIR for the next CIR sample index m=1 through Np. In a step 154 the raw CIR is tested against a threshold. In a step 156 when the raw CIR is less than the threshold, the filter 88 issues a filtered CIR of zero to the interpolator 92 for the current correlation sample index.

When the raw unfiltered CIR is equal to or greater than the threshold, in a step 158 the filter 88 issues a filtered CIR equal to the raw CIR to the interpolator 92 for the current sample index. In a step 162 the correlation sample index m is tested against Np. When the correlation sample index m is less than Np the raw unfiltered CIR is received for the next correlation sample index in the step 152. When the correlation sample index reaches Np the operation returns to the start for processing the raw unfiltered CIR for another block of correlation sample indexes m=1 to Np. The discrete noise reduction filter 88 of the present invention eliminates smear due to non-sample spaced channels, thereby preventing the smear from contaminating the channel estimates.

Figure 9:
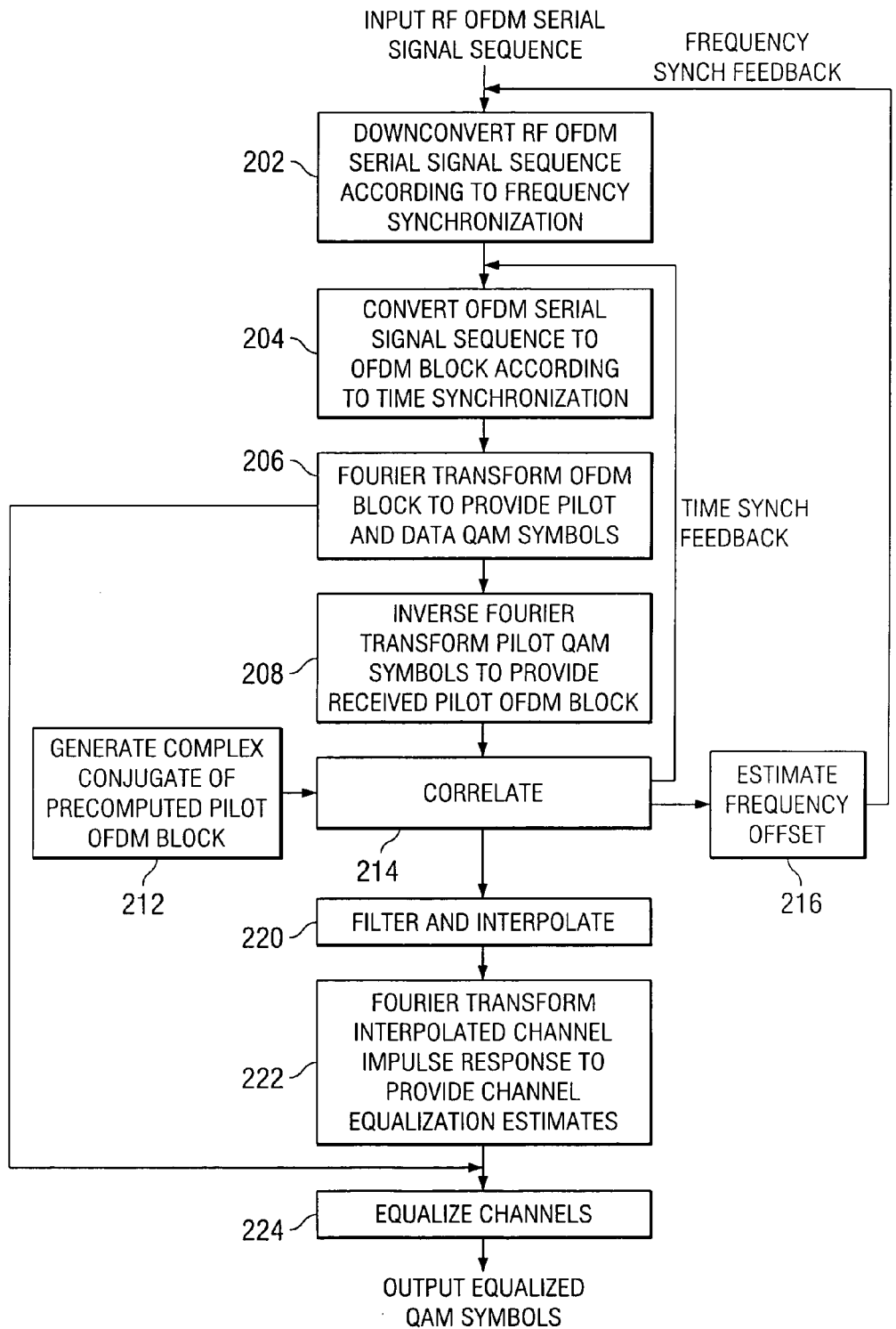
FIG. 9 is a flow chart of a method of the present invention for the OFDM receiver of FIG. 4.

FIG. 9 is a flow chart of steps of a temporal method of the present invention for the receiver 14A. In a step 202 the receiver 14A receives an RF OFDM signal having a multicarrier serial signal sequence and then frequency downconverts and digitizes the RF signal using feedback of frequency adjustment information for frequency synchronizing to the RF frequencies. In a step 204 the downconverted digitized signal is converted from serial OFDM samples to a parallel block of OFDM samples using time synchronization feedback for controlling the timing of the windows for the OFDM samples for making the OFDM block. In a step 206 the OFDM block is Fourier transformed for providing parallel QAM symbols. The QAM symbols have system pilot QAM symbols interspersed with the user data QAM symbols. The locations and the values of the pilot QAM symbols are known from the system specification.

The system pilot QAM symbols in a step 208 are selected at the expected locations and then inverse Fourier transformed to provide a received pilot OFDM block. In a step 212 the complex conjugates of the inverse Fourier transformed known pilot QAM symbols are generated (precomputed). In a step 214 the received pilot OFDM block is correlated with the precomputed pilot OFDM block for providing the correlation function $\rho_{Pilot}$. Times or correlation sample indexes for the peaks in the correlation function are used in the step 204 for time synchronization. In a step 216 information in the peaks of the correlation function is used for estimating a frequency offset. Frequency offset information is then used in the step 202 for frequency synchronization.

The correlation function is filtered, zero padded, and interpolated for forming an interpolated channel impulse response in a step 220. In a step 222 the filtered interpolated channel impulse response is Fourier transformed for providing channel estimates. Then, in a step 224 the channel estimates are applied to the QAM symbols determined in the step 206 for providing equalized QAM symbols.

Figure 10:
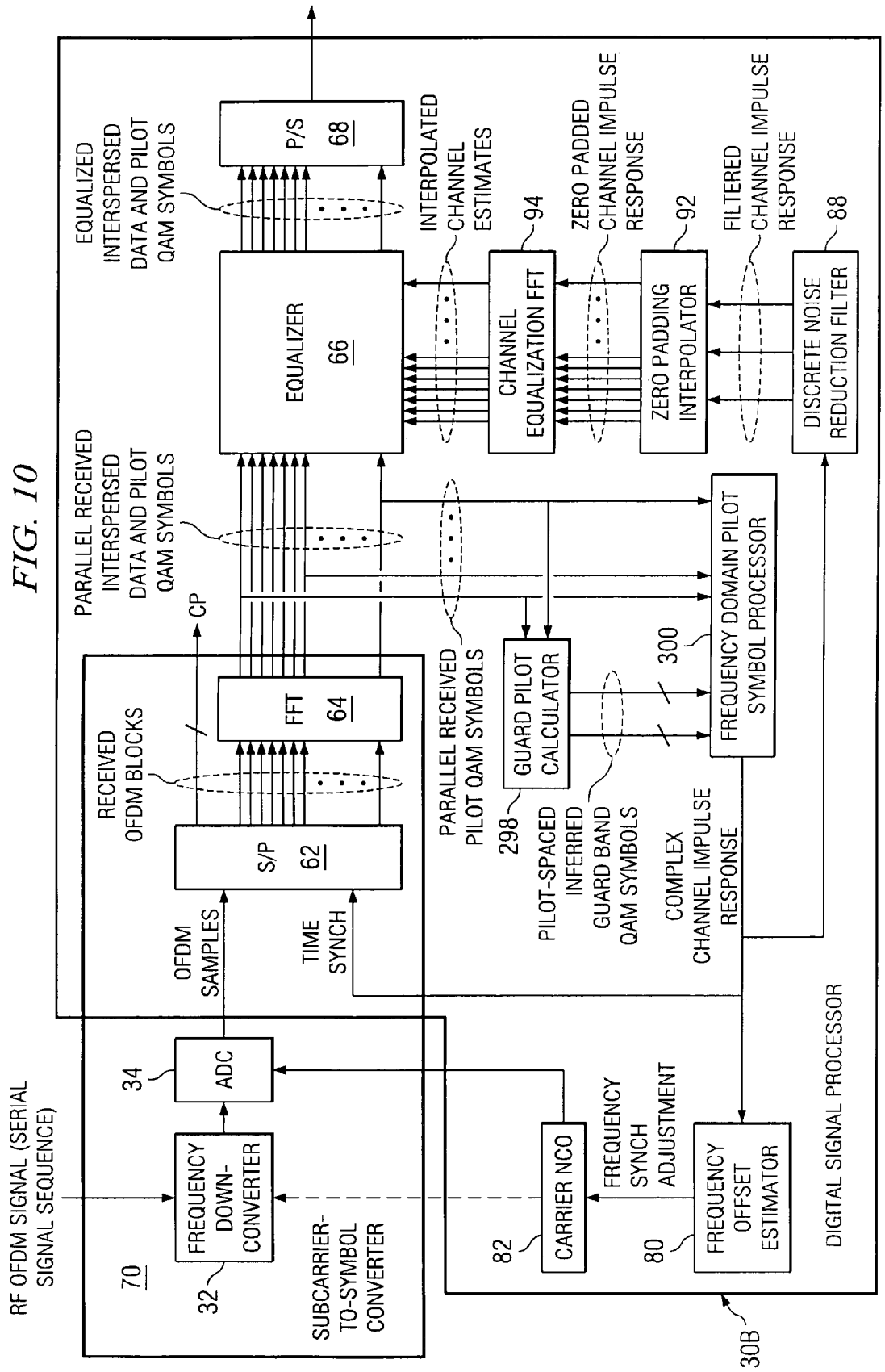
FIG. 10 is a block diagram of an OFDM receiver of the present invention using frequency domain pilot symbol processing for the OFDM transceiver of FIG. 2.

FIG. 10 is a block diagram showing the DSP 30B, the frequency downconverter 32, and the ADC 34 of the receiver 14B. For the receiver 14B, structural blocks having like reference identifiers to the structural blocks of the receiver 14A operate as described above for the receiver 14A. The receiver 14B differs from the receiver 14A by having a guard pilot calculator 298 and a frequency domain pilot symbol processor 300 in place of the pilot selective IFFT 72, the pilot OFDM generator 74, and the pilot block correlator 76 of the receiver 14A.

Referring briefly to FIG. 3, the IFFT 54 receives a parallel block of QAM symbols of known types at known symbol indexes k according to the system specification. Now referring briefly to FIG. 1A, the QAM symbols received by the IFFT 54 include low and high guard band zeros for designated numbers of known symbol indexes at each end of the parallel block of QAM symbols; and system pilot and user data QAM symbols interspersed in the center (non-guard) portion of symbol indexes. The symbol indexes of the system pilot and user data QAM symbols are known according to the system specification. The values of the system pilot QAM symbols may or may not vary over time depending upon the system specification but in any case they are known according to the system specification. The values of the user data QAM symbols vary according to the user information to be transmitted. The low outer and high outer system pilot QAM symbols are the pilot QAM symbols having the lowest and highest symbol indexes used for system pilot QAM symbols.

Figure 11:
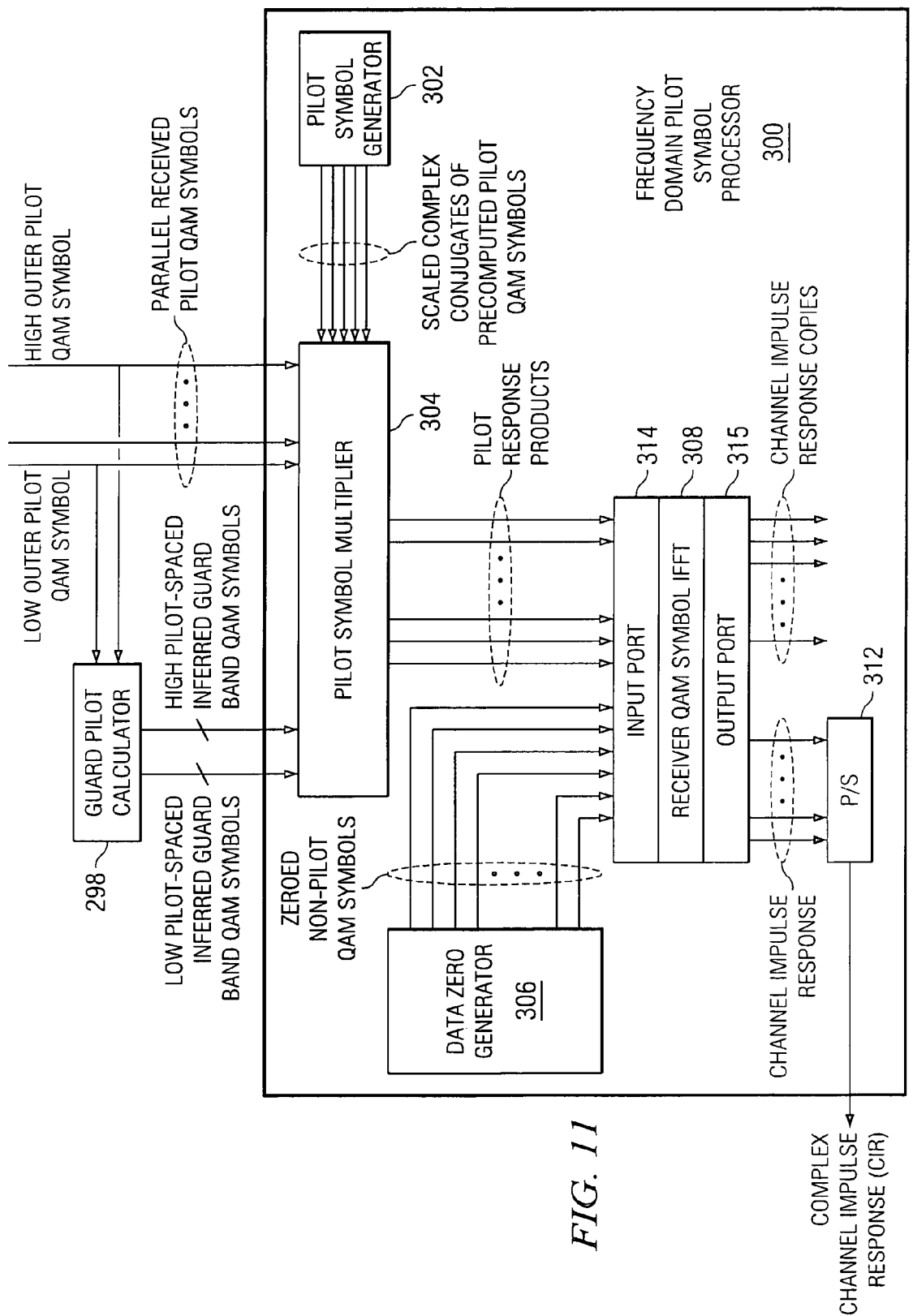
FIG. 11 is a block diagram of a frequency domain pilot symbol processor of the OFDM receiver of FIG. 10.

FIG. 11 is a block diagram showing the guard pilot calculator 298 and the frequency domain pilot symbol processor 300 of the receiver 14B. The guard pilot calculator 298 uses the values of the received low and high outer pilot QAM symbols for inferring symbol values at pilot-spaced symbol indexes within the low and high guard bands for providing inferred guard band QAM symbols at those symbol indexes.

The pilot-spaced guard band symbol indexes are the symbol indexes that would have system pilot QAM symbols if the system pilot QAM symbols were extended into the guard bands and interspersed in the guard bands in the same way that they are interspersed in the center (non-guard) portion of the parallel QAM symbol block. For example, assume that pilots symbols are spaced by three data symbols (every fourth symbol index) within the center (non-guard) portion of the symbol indexes. Then, the guard pilot calculator 298 provides inferred guard band QAM symbols within the guard band at every fourth symbol index. In a preferred embodiment, the inferred guard band QAM symbols in the low guard band are set equal to the low outer pilot QAM symbol and the inferred guard band QAM symbols in the high guard band are set equal to the high outer pilot QAM symbol. In another preferred embodiment, the inferred guard band symbols can be set to the average of several outer pilot QAM symbols. In another preferred embodiment, the inferred guard band QAM symbols in the low and high guard bands are set to extrapolate changes in values of several received pilot QAM symbols at symbol indexes at the lower and higher, respectively, ends of the center (non-guard) portion of symbol indexes. For example, the inferred guard band symbols can be set to continue the amplitude slope and/or deviation from linear phase of several outer pilot QAM symbols at low and high sample indexes.

The pilot symbol processor 300 includes a pilot symbol generator 302, a pilot QAM symbol multiplier 304, a data zero symbol generator 306, a receiver QAM symbol IFFT converter 308, and a parallel-to-serial (P/S) converter 312. In general the IFFT converter 308 may be an IDFT converter.

The pilot symbol generator 302 generates scaled complex conjugates of precomputed system pilot QAM symbols $P^{i*}/|P_k|^2$ including the inferred guard band QAM symbols that were calculated. The pilot symbol multiplier 304 multiplies the scaled complex conjugates of precomputed system pilot symbols by the corresponding received pilot QAM symbols from the FFT 64 and the corresponding inferred guard band QAM symbols for providing pilot response products. The data zero symbol generator 306 generates zero values for the user data QAM symbols and for the guard band symbols that do not have inferred QAM values.

In the receiver 14B, the effect of the guard tones that are set to zero for transmission are removed because the presence of "zero" pilots in place of the guard tones would otherwise create an artificial transition in the frequency domain. This artificial transition would cause ringing noise in the channel impulse response (time) estimate. Therefore, in a preferred embodiment, the value of the channel transfer function computed at the pilots on the edges is taken and used for pilot-spaced guard band symbols.

The receiver QAM symbol IFFT converter 308 has an N sized input port 314 and an N sized output port 315 where N is the total number of symbol indexes k. The input port 314 receives the pilot response products at the symbol index positions for the system pilot QAM symbols, zero values at the symbol index positions for user data QAM symbols, and low and high inferred pilot-spaced guard band pilot QAM symbols at guard band symbol index positions as described above. The receiver QAM IFFT converter 308 inverse Fourier transforms the QAM symbols received at the input port 314 and issues the channel impulse response and copies of the channel impulse response at the output port 315 having a size N. The channel impulse response has a size Np and each of the copies has a size Np where Np is the original number of system pilot symbols. The total size of the channel impulse response and copies is N.

It should be noted that IFFT converter 308 of size N has the benefit that the N wide hardware used for IFFT and/or FFT elsewhere in the transceiver 10B can be reused for the IFFT converter 308 so that no additional hardware is required. For an alternative system, the receiver QAM symbol IFFT 308 inverse Fourier transforms the pilot response products into the channel impulse response without copies. In any case, the parallel pilot channel impulse response is converted by the parallel-to-serial converter 312 to serial form and the serial channel impulse response (correlation function) $\rho_{Pilot}$ is then used as described above for time and frequency synchronization and channel estimation.

Figure 12:
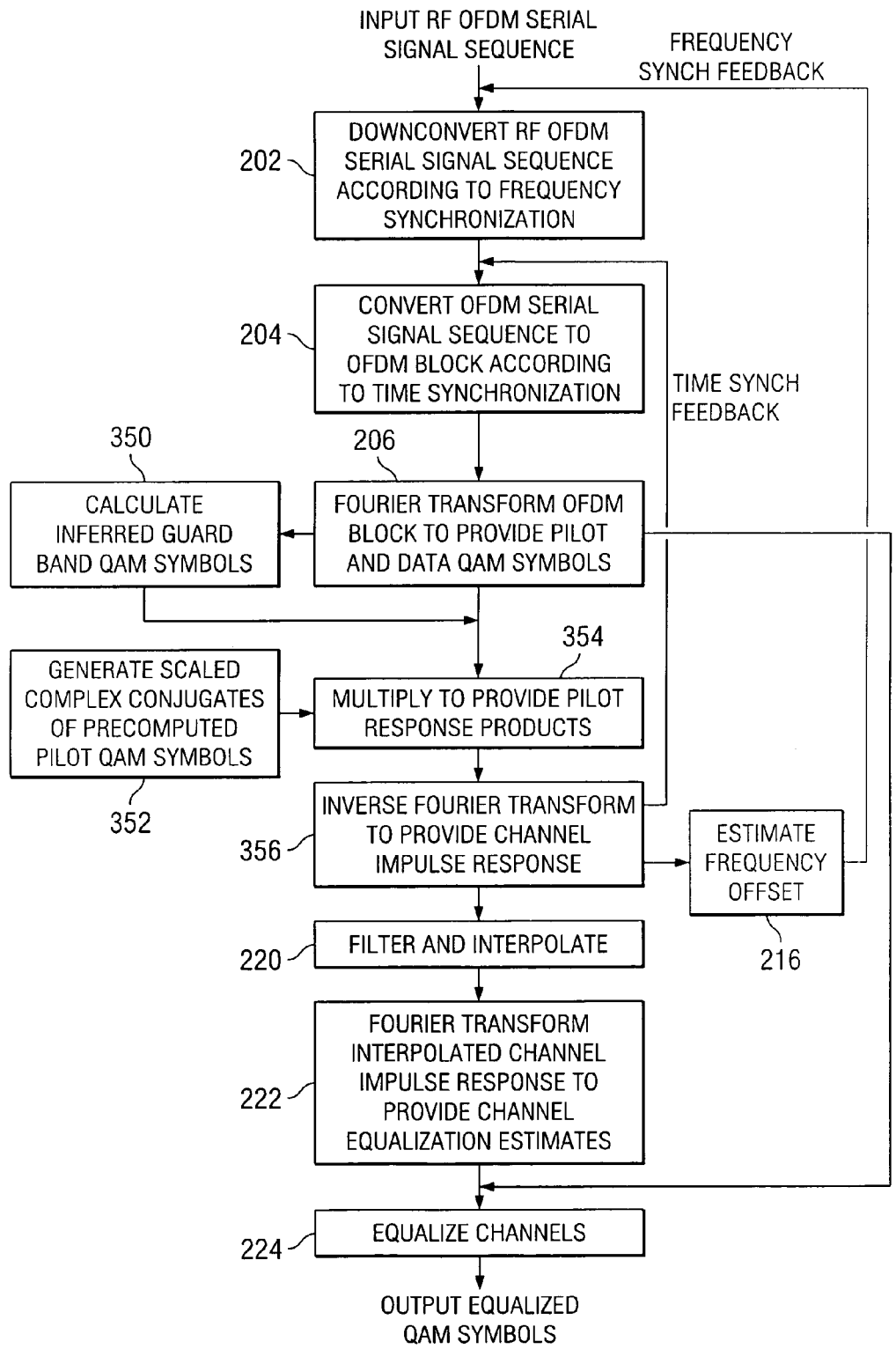
FIG. 12 is a flow chart of a method of the present invention for the OFDM receiver of FIG. 10.

FIG. 12 is a flow chart of a frequency domain method of the present invention for the receiver 14B. The steps in the frequency domain method having like reference identifiers to the steps of the temporal method illustrated in the FIG. 9 operate in the manner described above in the detailed description accompanying the FIG. 9. The frequency domain method differs from the temporal method by having steps 350, 352, 354, and 356 in place of the steps 208, 212, and 214.

In the step 350 the low and high pilot-spaced inferred guard band QAM symbols are calculated based upon the low and high outer pilot QAM symbols, respectively. In the step 352 scaled complex conjugates of the known pilot and inferred guard band QAM symbols $P_k^*/|P_k|^2$ are generated. In the step 354 the scaled complex conjugate QAM symbols are multiplied with the corresponding received pilot QAM symbols and corresponding inferred guard band QAM symbols for providing channel frequency response products. In the step 356, the products are inverse Fourier transformed for providing the channel impulse response (correlation function) $\rho_{Pilot}$.

Figure 13:
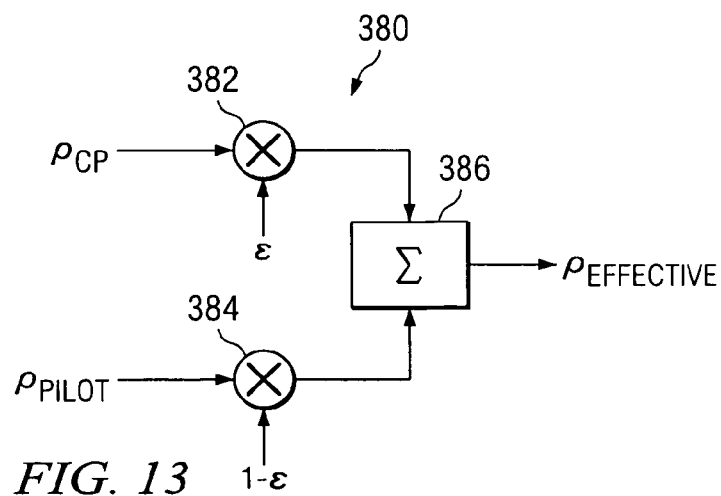
FIG. 13 is a block illustration of a correlation weighting combiner of the present invention using the IFFT pilot correlator of FIG. 5 or the pilot frequency domain symbol processor of FIG. 11 with the cyclic prefix correlator of FIG. 1B.

FIG. 13 is a block illustration of a correlation weighting combiner 380 including multipliers 382 and 384, and a summer 386. The correlation weighting combiner 380 provides an effective correlation function $\rho_{Effective}$ as a weighted combination of a correlation function or CIR $\rho_{Pilot}$ described above for the present invention and a correlation function or CIR generated in another way. In an exemplary case, the other correlation function is denoted as the correlation function $\rho_{CP}$ and derived from the cyclic prefix (CP) as illustrated in FIG. 1B and described in the prior art background. The multiplier 382 multiplies the correlation function $\rho_{Pilot}$ by a weighting factor $\xi$. The multiplier 384 multiplies the correlation function $\rho_{CP}$ by a weighting factor $1-\xi$. The summer 386 sums the weighted correlation functions for providing the effective correlation function $\rho_{Effective}$ as shown in an equation 8.

$$\rho_{Effective} = \xi \rho_{CP} + (1-\xi)\rho_{Pilot}. \quad (8)$$

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A multicarrier signal receiver for receiving a serial signal sequence of modulated subcarriers carrying information for input pilot and data symbols, comprising:

a subcarrier-to-symbol converter for converting said serial signal sequence into received pilot and data symbols representative of said input pilot and data symbols;

an inverse Fourier transformer for selecting said received pilot symbols from said received pilot and data symbols and then inverse Fourier transforming said received pilot symbols into received pilot multicarrier blocks a pilot multicarrier generator for generating a computed pilot multicarrier block having complex conjugates of system pilot symbols corresponding to said input pilot symbols;

a correlator for correlating said received pilot multicarrier blocks with said computed pilot multicarrier block for providing a correlation function;

a frequency offset estimator using said correlation function for providing a frequency synchronization adjustment; and a signal source for providing a reference signal having a frequency responsive to said frequency synchronization adjustment; wherein:

the subcarrier-to-symbol converter uses said reference signal for frequency synchronizing to said serial signal sequence and providing a frequency synchronized serial signal sequence, said received pilot and data symbols derived from said frequency synchronized serial signal sequence.

2. The receiver of claim 1, wherein:

said modulated subcarriers are an orthogonal frequency division multiplex (OFDM) signal formed by inverse Fourier transforming said input pilot and data symbols.

3. The receiver of claim 1, wherein:

the subcarrier-to-symbol converter includes a Fourier transformer for Fourier transforming a representation of said serial signal sequence to said received pilot and data symbols.

4. The receiver of claim 1, wherein:

the frequency offset estimator includes a peak phase detector for determining phases of peaks, respectively, of said correlation function; a block differencer for determining a phase difference between two said phases; and a discriminator for providing said frequency synchronization adjustment based upon said phase difference.

5. The receiver of claim 1, wherein:

the frequency offset estimator includes a frequency adjustment sweeper for varying said frequency synchronization adjustment; and a synch peak detector for monitoring said correlation function and fixing said frequency synchronization adjustment when a peak of said correlation function exceeds a threshold.

6. The receiver of claim 1, wherein:

the subcarrier-to-symbol converter includes a time synchronization serial-to-parallel converter for time synchronizing said serial signal sequence into received multicarrier blocks according to times of peaks of said correlation function; and a Fourier transformer for Fourier transforming said received multicarrier blocks into said received pilot and data symbols.

7. The receiver of claim 1, further comprising:

a discrete noise reduction filter for receiving a raw said correlation function at discrete sample indexes and issuing a filtered said correlation function having filtered peaks at said discrete sample indexes for raw peaks of said raw correlation function greater than a threshold and having a zero level at said discrete sample indexes for said raw peaks of said raw correlation function less than a threshold.

8. The receiver of claim 7, further comprising:

an interpolator for interpolating said filtered correlation function for providing a channel impulse response;

a Fourier transformer for transforming said channel impulse response for forming channel estimates; and an equalizer for using said channel estimates for equalizing said received pilot and data symbols.

9. A method for receiving a serial signal sequence of modulated subcarriers carrying information for input pilot and data symbols, comprising:

converting said serial signal sequence into received pilot and data symbols representative of said input pilot and data symbols;

selecting said received pilot symbols from said received pilot and data symbols;

inverse Fourier transforming said received pilot symbols into received pilot multicarrier blocks;

generating a computed pilot multicarrier block having complex conjugates of system pilot symbols corresponding to said input pilot symbols;

correlating said received pilot multicarrier blocks with said computed pilot multicarrier block for providing a correlation function;

converting said correlation function to a frequency synchronization adjustment;

providing a reference signal having a frequency responsive to said frequency synchronization adjustment;

using said reference signal for frequency synchronizing to said serial signal sequence and providing a frequency synchronized serial signal sequence; and using said frequency synchronized serial signal sequence for providing said received pilot and data symbols.

10. The method of claim 9, further comprising:
inverse Fourier transforming said input pilot and data symbols for forming said modulated subcarriers as an orthogonal frequency division multiplex (OFDM) signal.

11. The method of claim 9, wherein:
converting said serial signal sequence into received pilot and data symbols includes Fourier transforming a representation of said serial signal sequence to said received pilot and data symbols.

12. The method of claim 9, wherein:
converting said correlation function to said frequency synchronization adjustment comprises:
detecting phases of peaks, respectively, of said correlation function;
determining a phase difference between two said phases; and
providing said frequency synchronization adjustment based upon said phase difference.

13. The method of claim 9, wherein:
converting said correlation function to said frequency synchronization adjustment comprises:
varying said frequency synchronization adjustment;
monitoring said correlation function; and
fixing said frequency synchronization adjustment when a peak of said correlation function exceeds a threshold.

14. The method of claim 9, further comprising:
time synchronizing said serial signal sequence into received multicarrier blocks according to times of peaks of said correlation function; and
Fourier transforming said received multicarrier blocks into said received pilot and data symbols.

15. The method of claim 9, further comprising:
receiving a raw said correlation function at discrete sample indexes; and
issuing a filtered said correlation function having filtered peaks at said discrete sample indexes for raw peaks of said raw correlation function greater than a threshold and having a zero level at said discrete sample indexes for said raw peaks of said raw correlation function less than a threshold.

16. The method of claim 15, further comprising:
interpolating said filtered correlation function for providing a channel impulse response;
Fourier transforming said channel impulse response for forming channel estimates; and
equalizing said received pilot and data symbols based upon said channel estimates.

17. A method of processing a received multicarrier signal, the multicarrier signal comprising a plurality of subcarriers carrying pilot and data symbols, the method comprising:
converting pilot symbols into received pilot multicarrier blocks;
generating a computed pilot multicarrier block having complex conjugates of system pilot symbols corresponding to received pilot symbols;
correlating the received pilot multicarrier blocks with the computed pilot multicarrier block to provide a correlation function;
estimating a frequency offset using the correlation function to provide a frequency synchronization adjustment;
generating a reference signal having a frequency responsive to the frequency synchronization adjustment; and
synchronizing the received multicarrier signal using the reference signal to provide a synchronized received multicarrier signal.

18. A method according to claim 17, wherein providing the frequency synchronization adjustment comprises:
detecting phases of peaks, respectively, of the correlation function;
determining a phase difference between two said phases; and
providing said frequency synchronization adjustment based upon said phase difference.

19. A method according to claim 17, wherein providing the frequency synchronization adjustment comprises:
varying said frequency synchronization adjustment;
monitoring said correlation function; and
fixing said frequency synchronization adjustment when a peak of said correlation function exceeds a threshold.

20. A method according to claim 17, further comprising:
synchronizing the received multicarrier signal to provide a synchronized received multicarrier signal according to times of peaks of said correlation function.

21. A method according to claim 17, further comprising:
receiving a raw said correlation function at discrete sample indexes; and
issuing a filtered said correlation function having filtered peaks at said discrete sample indexes for raw peaks of said raw correlation function greater than a threshold and having a zero level at said discrete sample indexes for said raw peaks of said raw correlation function less than a threshold.

22. A method according to claim 21, further comprising:
interpolating said filtered correlation function for providing a channel impulse response;
forming channel estimates from said channel impulse response; and
equalizing said pilot and data symbols based upon said channel estimates.

* * * * *